United States Patent [19]
van Basshuysen

[11] 3,793,833
[45] Feb. 26, 1974

[54] DEVICE FOR REDUCING HARMFUL CONSTITUENTS OF THE WASTE GASES IN INTERNAL COMBUSTION ENGINES OF AUTOMOBILES

[75] Inventor: Richard van Basshuysen, Kirschenweg, Germany

[73] Assignee: Audi Nsu Auto Union Aktiengesellschaft, Neckarsulm, Germany

[22] Filed: Nov. 12, 1971

[21] Appl. No.: 198,110

[30] Foreign Application Priority Data
Dec. 17, 1970 Germany............................ 2062220

[52] U.S. Cl.................. 60/284, 60/285, 123/117 A
[51] Int. Cl................................................ F02b 75/10
[58] Field of Search.... 123/117 A, 179 BG; 60/284, 60/285

[56] References Cited
UNITED STATES PATENTS

| | | | |
|---|---|---|---|
| 2,809,619 | 10/1957 | Norris............................ | 123/117 A |
| 3,301,242 | 1/1967 | Candelise........................ | 123/117 A |
| 3,491,735 | 1/1970 | Walker........................... | 123/117 A |
| 3,457,905 | 7/1969 | Jukes............................. | 123/117 A |
| 3,626,909 | 12/1971 | Hayashida....................... | 60/285 |
| 3,646,921 | 3/1972 | Marsee........................... | 123/117 A |

*Primary Examiner*—Douglas Hart
*Attorney, Agent, or Firm*—Kane, Dalsimer, Kane, Sullivan and Kurucz

[57] ABSTRACT

This invention relates to a device for reducing harmful waste gas components of automobile internal combustion engines by external ignition. A waste gas reactor is fitted on the engine exhaust pipe, in which the unburnt waste gas components are burnt, with the addition of air, if necessary, and which is equipped with combustion time control that can be adjusted for a predetermined time on starting in the direction of retarded ignition by the diminished pressure in the suction duct.

3 Claims, 1 Drawing Figure

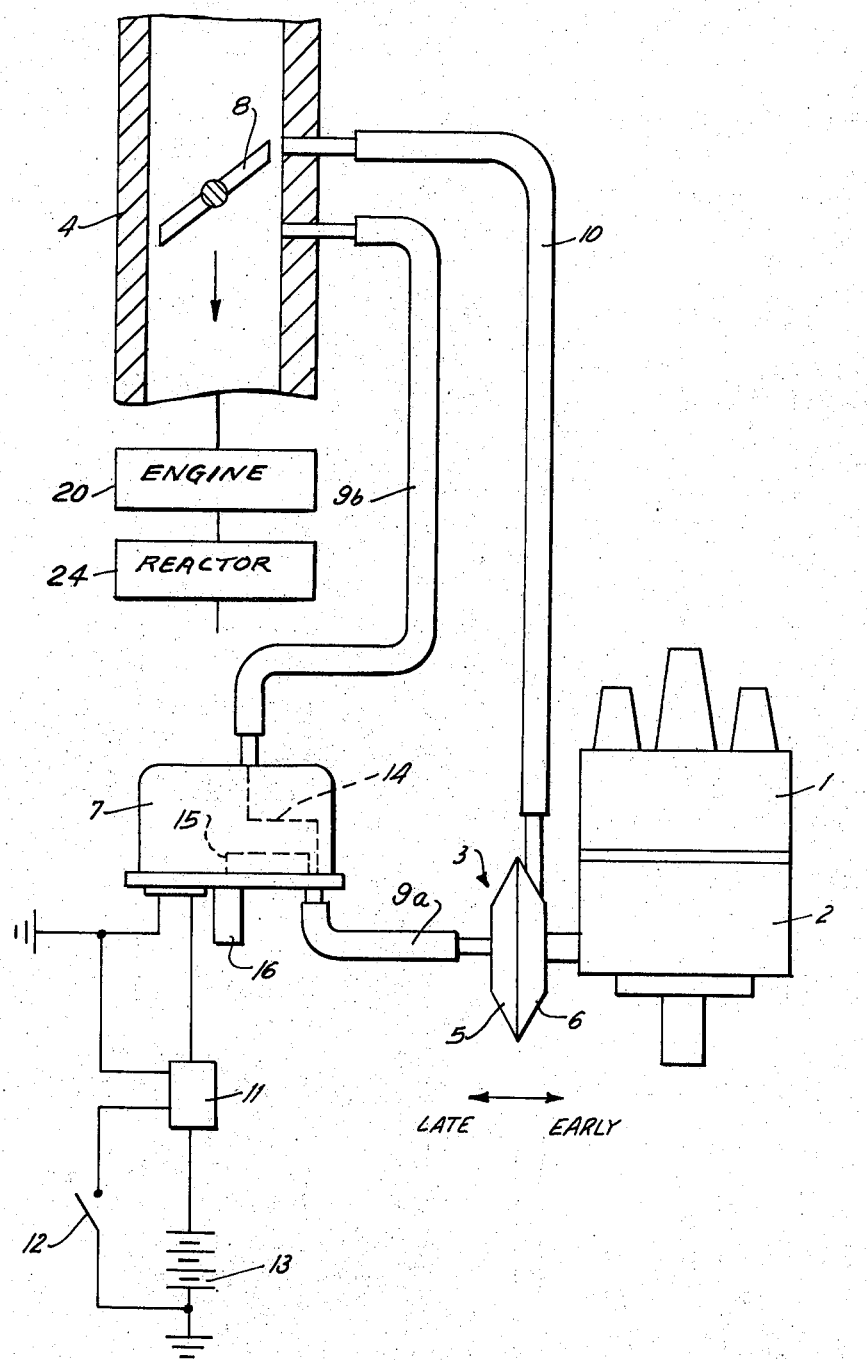

DEVICE FOR REDUCING HARMFUL CONSTITUENTS OF THE WASTE GASES IN INTERNAL COMBUSTION ENGINES OF AUTOMOBILES

This application relates to my commonly assigned application entitled "Thermal Reactor" filed under Ser. No. 198,113 on even date herewith.

As is known, the thermal and catalytic waste gas reactors operate only after they have reached a certain minimum temperature. For a reactor to operate rapidly, one has to adjust the combustion (time) point and the retarded ignition in a way that the temperature of the waste gas is considerably higher than that for premature ignition, so that the reactor reaches its working temperature quickly. It is disadvantageous if, in retarded ignition, the consumption of the fuel is higher and that the character of the driving is lowered; and besides there arises a danger of the overheating of the combustion engine or of the exhaust system. As such, it is suggested that the combustion point should be adjusted to the working temperature of the combustion engine, so that after the reactor has attained the working temperature of the combustion point, the latter should be adjusted to the temperature of premature ignition, even if at the start it was at retarded ignition temperature. This regulation of the combustion point in relation to the working temperature of the combustion engine, as for example, depending on the temperature of the oil or of the cooling liquid, has several disadvantages. The warm-up time of the combustion engine of the coolant is in general considerably longer than the warm-up time of the reactor, which normally consists of thin sheets. From this it follows that, for a control depending on the working temperature of the combustion engine, the combustion point is adjusted considerably longer at retarded ignition than that necessary for the functioning of the reactor. The result is an increased fuel consumption. On the other hand, the adjustment of the combustion point cools the reactor down considerably faster than the combustion engine itself, so that when the combustion engine is restarted, the temperature of the cooling liquid can still be so high that the combustion point remains at premature ignition, even if the temperature of reactor is not high enough for an afterburning.

The foregoing problems and disadvantages provide a basis for this invention which eliminates the disadvantages of known engines inasmuch as a device is provided that essentially guarantees safe operation of the waste gas reactor under all working conditions.

Towards this end, this invention provides a valve arranged in the combustion point regulator of the decreased pressure tubing attached to the suction duct. The valve is opened at the start of the combustion engine and closes again after a certain period of time. The advantage of the invention over the known engines lies in that at every starting operation, the combustion point is securely adjusted to retarded ignition. Accordingly, rapid activation of the reactor is assured, in which case the combustion engine is shut off only for a short time which, however, does not let the combustion engine cool down, while being adequate for the reactor. Thus, the retarded ignition is regulated irrespective of the working temperature of the combustion engine, inasmuch as the closing of the valve after a certain time following the start is equivalent to adjustment of the combustion point to a premature ignition. The time period depends upon several factors, such as the construction and the size of the reactor, the waste gas quantity and temperature, the fuel-air proportion, the extent of the retarded ignition, etc.; however, this time period can be easily determined within relatively close limits for a particular combustion engine and an attached waste gas reactor. Therefore, it is possible to adjust the combustion point to retarded ignition in a normal drive, essentially during the time needed for the reactor to activate. This is specially important for driving in the city, when the combustion engine attains its working temperature after a relatively longer driving time, while the reactor achieves its activation temperature in a few minutes.

It is well known that the adjustment of the combustion point regulator is effected by the provision of two diaphragm boxes, the first of which is linked with the suction duct upstream to the throttle valve, while the second works downstream. In this invention, using an arrangement of this type, the valve is so arranged in the duct that, while connecting the second diaphragm with the suction duct downstream to the throttle valve, it links the second diaphragm with the atmosphere in the closed position. In the closed position of the valve, there occurs the adjustment of the combustion point, exclusively with the help of the first diaphragm box, which operates in the premature ignition range.

The following described embodiment should be taken in conjunction with the accompanying drawing. In this drawing, 1 indicates a conventional distributor, containing an ignition point regulator 2, which is adjusted by a double diaphragm box 3, in relation to the decreased pressure in the suction duct 4, of the combustion engine. The double diaphragm box 3 includes diaphragm chambers 5 and 6, of which the diaphragm chamber 5 is coupled with the suction duct 4, downstream of the throttle valve 8 through a magnetic valve 7, while the diaphragm chamber 6 is directly connected with the suction duct 4 upstream of throttle valve 8 through the tubing 10. If there occurs a low pressure in the diaphragm chamber 5 which is higher than the decreased pressure obtainable in the diaphragm chamber 6, the ignition point becomes adjusted at the retarded ignition while the premature ignition results, if the reduced pressure in the diaphragm chamber 6, is greater than that in the diaphragm chamber 5.

The magnetic valve is provided for use in starting and for obtaining retarded ignition during a certain time period after starting. This valve is operated by time switch 11 engaged by a contact 12 and remains closed at the starting of the combustion engine. The time switch 11 may be an electronic time relay or a bimetallic switch. This switch is switched on by the closing of the contact 12 and the magnetic valve 7 is then connected with the battery 13 and is brought to a position coupling the tubing 9a and 9b. In this way, a decreased pressure occurs in the diaphragm chamber 5, which acts in the suction duct downstream of the throttle valve. This reduced pressure is considerably higher than the diminished pressure upstream in the throttle valve 8 and, consequently, in the diaphragm chamber 6. This causes the combustion point regulator 2 to be adjusted in the direction of the retarded ignition. A certain time after the engaging of the time switch 11, the magnetic valve 7 is uncoupled from the battery 13, so that the magnetic valve 7 is disposed in the current circuit 15, thereby exposing the tubing 9b to the atmosphere, through the stud 16. The decreased pressure in the diaphragm chamber 6 is the only decisive factor for the adjustment of the ignition point, which results in the regulation of the combustion point in the direction of the premature ignition. Independent of the adjustment of the decreased pressure, the ignition point regulator is equipped with the usual adjusting device working on the number of the revolutions.

It is evident that by the use of the indicated device the combustion point is adjusted to the retarded ignition at the starting of the combustion engine 20, and for a definite time maintained so, till the waste gas reactor 24 has attained its working temperature.

Thus, the several aforenoted objects and advantages are most effectively attained. Although a somewhat preferred embodiment has been disclosed and described in detail herein, it should be understood that this invention is in no sense limited thereby and its scope is to be determined by that of the appended claims.

What is claimed is:

1. A device for diminishing the harmful waste gas constituents of an automobile combustion engine with external ignition, an exhaust pipe, a waste gas reactor fitted to the exhaust pipe of the engine and in which the unburnt waste gas constituents are subsequently burnt, a suction duct comprising a throttle valve, an ignition point regulator which is adjustable by decreased pressure in the suction duct in the direction of retarded ignition, a diaphragm box for the adjustment of the regulator, a pair of decreased pressure tubings coupling said diaphragm box with the suction duct downstream of said throttle valve, a second valve interposed between the tubings which valve in an open state connects the diaphragm box with the suction duct and in a closed state connects the diaphragm box with the atmosphere, an electrical time switch controlling said second valve, a circuit of said time switch comprising a switch which closes said circuit by the starting of the engine whereby said time switch is energized to cause said second valve to open and, after a predetermined time, permits it to close again.

2. A device in accordance with claim 1 in which two diaphragm boxes are provided for the adjustment of the ignition point regulator, the first of which is coupled with the suction tube, upstream of the throttle valve, while the second is coupled downstream of the throttle valve, the second valve is arranged so as to connect the second diaphragm box with the suction tube downstream of the throttle valve and that the second valve is so made that in the closed state the second diaphragm box is connected with the atmosphere.

3. A device in accordance with claim 2 in which the second valve is constructed as a two-way magnetic valve and which in the activated position makes a contact between the diaphragm box and the suction duct, and which in the other position connects the diaphragm box to the atmosphere.

* * * * *